United States Patent
Chen et al.

(10) Patent No.: US 9,063,799 B1
(45) Date of Patent: Jun. 23, 2015

(54) METHOD FOR ENCAPSULATING FUNCTIONS FOR APPLICATION PROGRAMMING INTERFACES IN A CLOUD ENVIRONMENT

(71) Applicant: ProphetStor Data Services, Inc., Taichung (TW)

(72) Inventors: Wen Shyen Chen, Taichung (TW); Sheng Lin Wu, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 0 days.

(21) Appl. No.: 14/219,687

(22) Filed: Mar. 19, 2014

(51) Int. Cl.
*G06F 13/00* (2006.01)
*G06F 9/54* (2006.01)

(52) U.S. Cl.
CPC ........................................ *G06F 9/54* (2013.01)

(58) Field of Classification Search
CPC ............................... G06F 9/4411; G06F 9/541

USPC ............................................ 719/321, 327, 328
See application file for complete search history.

(56) References Cited

U.S. PATENT DOCUMENTS

| | | | |
|---|---|---|---|
| 6,681,284 B1 * | 1/2004 | Thomson et al. | 710/305 |
| 6,941,543 B1 * | 9/2005 | Brown et al. | 717/107 |
| 7,536,679 B1 * | 5/2009 | O'Connell et al. | 717/126 |
| 2007/0214462 A1 * | 9/2007 | Boillot | 719/328 |
| 2011/0173351 A1 * | 7/2011 | Aull et al. | 710/8 |
| 2013/0326543 A1 * | 12/2013 | Aull et al. | 719/321 |

* cited by examiner

*Primary Examiner* — Andy Ho
(74) *Attorney, Agent, or Firm* — Che-Yang Chen; Law office of Michael Chen

(57) ABSTRACT

A method for encapsulating functions for application programming interface in a cloud environment is disclosed. The method includes the steps of: A. providing an API supported by a driver; B inheriting the API as a new class if the API is usable for a service device in a computing node environment; C. augmenting extending function(s) for the service device to the driver; and D. repackaging the driver to conform to the inherited API.

11 Claims, 5 Drawing Sheets

METHOD FOR ENCAPSULATING FUNCTIONS FOR APPLICATION PROGRAMMING INTERFACES IN A CLOUD ENVIRONMENT

FIELD OF THE INVENTION

The present invention relates to a method for encapsulating functions for application programming interfaces (APIs). More particularly, the present invention relates to a method for encapsulating functions for APIs in a cloud environment.

BACKGROUND OF THE INVENTION

Cloud computing is not a kind of new technology. It is a concept based on application of computer techniques and develops to an aspect of exchange over internet. The term of cloud means internet. Cloud computing is the use of internet communication and computing tasks via multiple computers, or access to services provided by the remote host over a network connection. Cloud computing was first proposed by Amazon. Google and Microsoft followed up due to internet shopping platform.

Cloud computing is a new application of distributed computing. A request, maybe a large arithmetic processing program, is automatically split into numerous smaller subroutines and the subroutines are treated by a large system consisting of a number of servers via internet. After searching, operating and analyzing, the system sends a result of the request back to the end user. Through this technology, network service providers can handles tens of millions or even billions of information to achieve network services with equally strong performance as a super computer within seconds.

Cloud computing is a shared IT infrastructure, just like a huge virtual server. Numbers of computer systems are linked into a large resource library to providing IT services. Because cloud computing utilizes virtual resources, it is not restricted by distal or proximal computer hardware. Cloud computing has strong demand for storage capacity. Therefore, it will drive the requirement for Redundant Array of Independent Disks (RAIDs).

According to different services supported by cloud computing and targets that the services are provided to, many cloud environments can be defined. For example, private cloud, public cloud, community cloud and hybrid cloud are available on internet. Although the clouds may not identical in operation system, capacity, service target and resources, it is a trend that some clouds can be integrated to provide wider services or share their resources. Open-sourced projects or software to achieve the goal mentioned above are available nowadays. Openstack is one of the examples.

With the development of the open source cloud computing platforms for all clouds, there are still some hardware problems that need to be settled, for example, compatibility of hardware to the cloud. For a computing node environment, it generally provides common application programming interfaces (APIs) for a device (e.g., a hard disk and a device driver for it on Windows platform). Each device vendor needs to implement the device driver supporting the API to provide the device service. However, if the device driver needs to extend services and/or the computing node environment changes (e.g., upgrade of Windows platform to a new version), there is too much work for each individual vendor in rewriting the device driver. The aforementioned problem is just happened in one single platform (operation system). If the problem is concerning another "cloud", it becomes more complex to solve.

Meanwhile, there are many electric equipment that are "smart". It means the electric equipment was stand-alone before but it can be driven by a Central Processing Unit (CPU) and linked to internet for remote control now. For instance, a cloud printing machine. Possibly, a home appliance, such as a refrigerator, can be controlled by cloud users. Compatible APIs for the CPU or the computing node that electric equipment is linked should be available for every related cloud environments. The application of new electric equipment in the cloud may need to have new API or utilize an existing and functionally-like API to modify. It encounters similar problems as illustrated above.

Although cloud computing can provide convenient and powerful services, compatibility of related hardware in a cloud environment is the first issue before the whole clouds works with one another. It is desired to have a way to encapsulate necessary functions for APIs for services devices in a cloud environment.

SUMMARY OF THE INVENTION

As mentioned above, an API may not suitably support all service devices connected to a computing node in a specified computing node environment. Therefore, a way to encapsulate necessary functions for APIs for services devices in a cloud environment is required.

Hence, according to an aspect of the present invention, a method for encapsulating functions for application programming interfaces (API) in a cloud environment includes the steps of: A. providing an API supported by a driver; B. inheriting the API as a new class if the API is usable for a service device in a computing node environment; C. augmenting extending function(s) for the service device to the driver; and D. repackaging the driver to conform to the inherited API.

The method that further includes steps between step B and step C: B1. providing a function set which contains functions which can be used for the service device; B2. comparing functions of the driver with that of the function set; and B3. taking at least one function in the function set which is not included by the drive as the extending function.

Preferably, the method further comprising a step between step C and step D: C1. collecting at least one function of the driver which is not included by the function set to the function set.

According to the present invention, the API is useable when the API is able to function the service device and is compatible with the computing node environment. The cloud environment is implemented by open-sourced software or proprietary software. Preferably, the service device is a storage device or a peripheral device.

Here, the storage device is a Compact Disk Recordable and Writable (CD-RW) Drive, a Compact Disc Read-Only Memory (CD-ROM) Drive, a hard disk, a solid-state disk, a memory module, a magnetic tape machine or any device capable of storing data. The peripheral device is a printing machine, an audio equipment, a video equipment, a monitor, a surveillance camera, a home appliance or any device capable of working off internet. The computing node environment is able to update a new version of an operation system thereof and the API is compatible with the newest version of the operation system. The computing node environment contains a computing node and the computing node is a server or Personal Computer (PC).

By application of the present invention, drivers from many vendors can be transformed to a specified driver and repacked in an API, especially for open-sourced cloud environment, such as Openstack. Thus, by using the new driver (inherited API), it is possible to provide management for a computing unit in the open-sourced cloud environment (Nova, computer node). This is also the way to encapsulate necessary functions for APIs for services devices in a cloud environment is required.

DETAILED DESCRIPTION OF THE PREFERRED EMBODIMENTS

The present invention will now be described more specifically with reference to the following embodiments.

Figure 1:
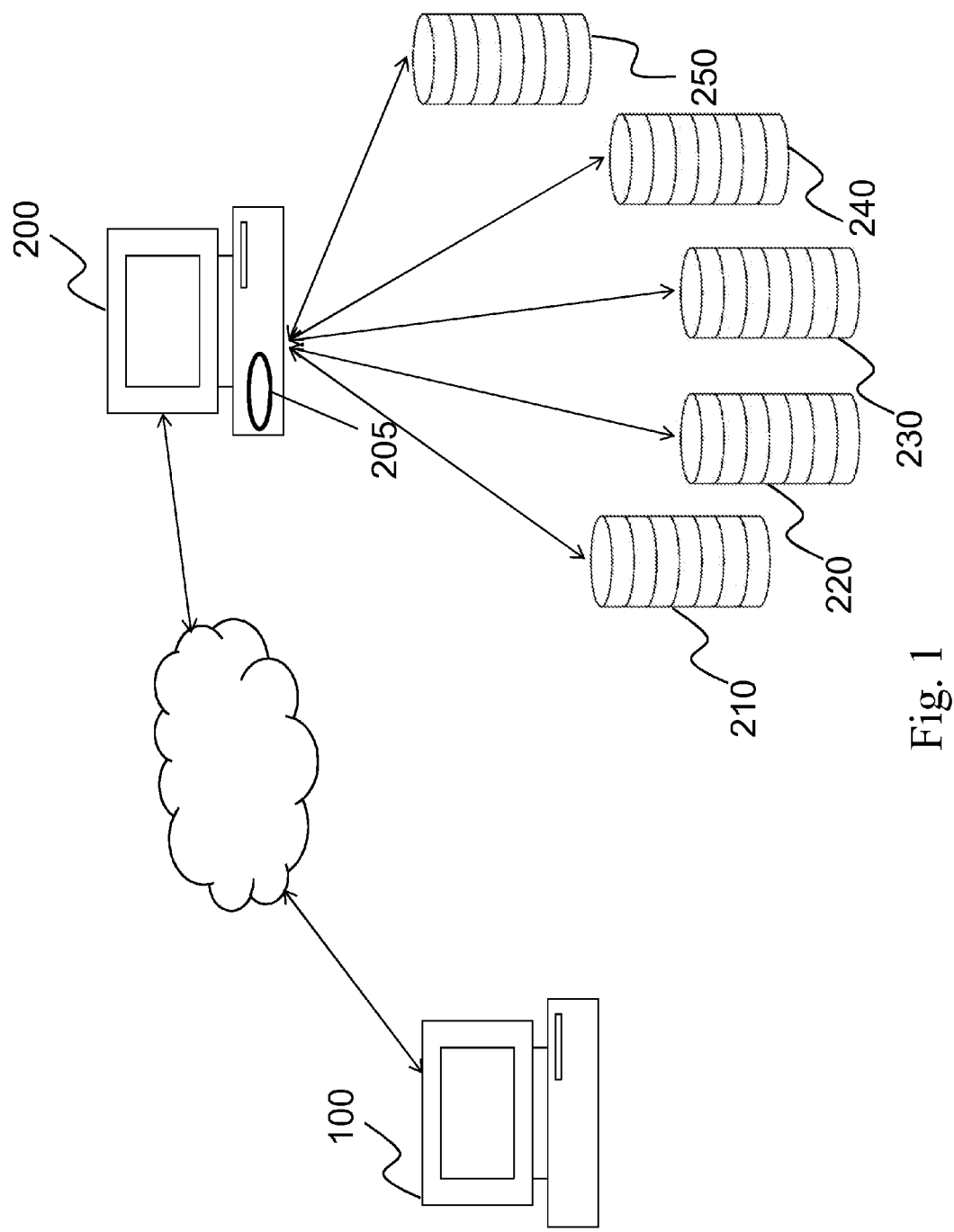
FIG. 1 shows an infrastructure of a cloud environment.

Please see FIG. 1. In a cloud environment, there are many computing nodes. Each computing node may have a unique function, for example, an application server 100 may access services of all computing nodes (not all of them are shown) in the whole cloud system. The computing nodes may include a storage server 200. In the cloud environment, each computing node may have the same or different operation system. Even some of the computing nodes apply the same operation system, there would be differences in versions. Service devices linked to the computing node may encounter problems of updating driver for different operation version to the related API. It may be another scenario that a new service device is installed or an old one needs to be replaced.

Figure 2:
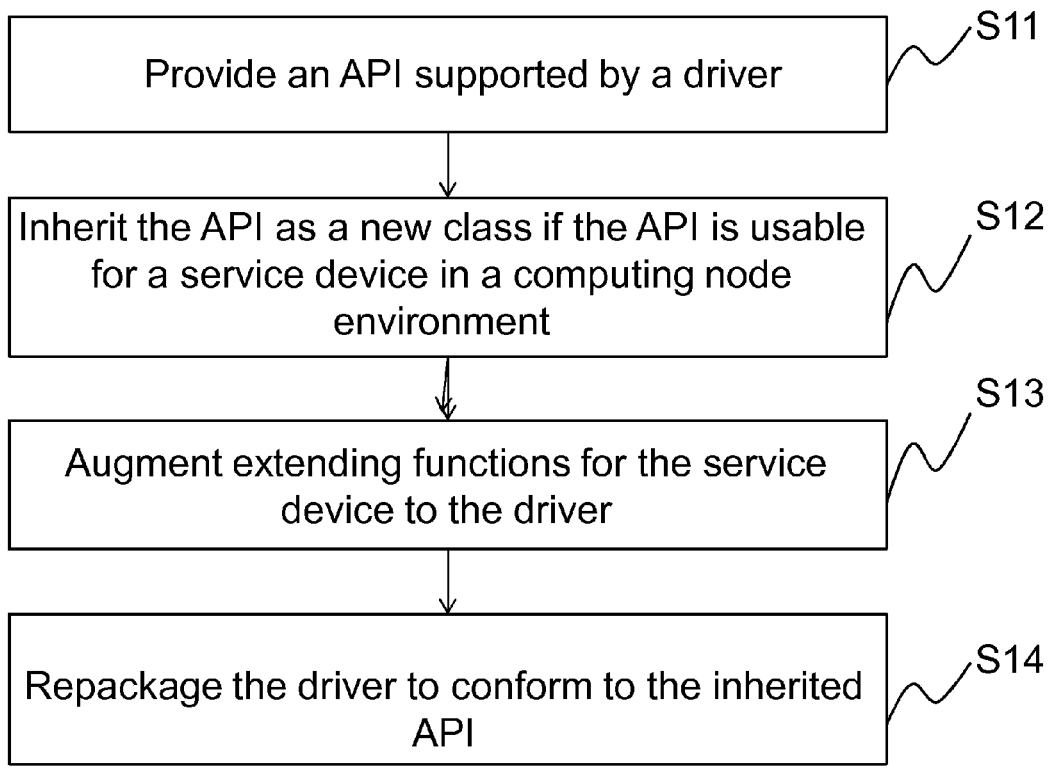
FIG. 2 is a flow chart for encapsulating functions for application programming interface in the cloud environment according to the present invention.

In one embodiment, the storage server 200 administrates 5 hard disks 210, 220, 230, 240 and 250. In practice, the storage server 200 can be a personal computer just with server operation system. It may be off line for other job functions. The hard disks 210, 220, 230, 240 and 250 are Redundant Array of Independent Disks, RAIDs. Each of them has a storage management module (not shown) for managing operation according to the commands from the driver through an API of the storage server 200. One of them needs to be replaced with a new one for repairing. The hard disk 210 shows the new hard disk. It is a hard disk of a different brand, providing the same functions like other hard disks but different in functions of its driver. When the hard disk 210 is installed and linked to the storage server 200, it is not compatible to the storage server 200 and some functions can't be performed. Now, this problem can be solved by the present invention. Please refer to FIG. 2. The procedures are as below. First, a docking station module 205 in the storage server 200 will take the provided API supported by a driver (S11) and tests if the API is usable for the hard disk 210 in a computing node environment. Here, the docking station module 205 can be a physical module or software installed in the storage server 200. Preferably, the docking station module 205 is software-defined. The computing node environment includes the current version of the operation system. The API is useable when the API is able to function the hard disk 210 and is compatible with the computing node environment. If the answer is yes, the docking station module 205 will inherit the current API as a new class (S12). Let's define it as an inherited API for illustration below.

Then, the storage server 200 will try to check if there are some extending functions for the driver of the hard disk 210. The computing node environment disclosed in the present embodiment is under one open-sourced software: Openstack. Therefore, based on different storage purposes for management, all vendors will provide their volume drivers to the Cinder module of Openstack for their hard disks. Usually, the volume driver only supports limited functions, such as create, delete, assign, unassign, and volume. These fundamental functions in the API can be left for use. For some other functions, such as display of fundamental data, set data, build volume in assigned pool, access to these data, etc. may not be included in the functions of the API. However, these functions are available for the driver of the hard disk 210. Hence, the docking station module 205 will augment these functions as extending functions for the hard disks 220, 230, 240 and 250 to the driver (S13) in way of repackaging the driver to conform to the inherited API (S14).

It should be emphasized that the cloud environment can be implemented by open-sourced software or proprietary software. Therefore, the software is not limited to Openstack only. Other suitable open-sourced or proprietary software or even a platform is an option. Form the present embodiment that it is clear that the computing node, storage server 200, is in charge of accessing hard disks. In fact, the node may be a server to manage a number of other devices, e.g., other storage devices or peripheral devices (service devices). For example, one server can be used to control several Compact Disk Recordable and Writable (CD-RW) Drive for data reading and writing. It can be the storage device. The storage is not limited to hard disks and CD-RW, it also includes a Compact Disc Read-Only Memory (CD-ROM) Drive, a hard disk, a solid-state disk, a memory module, a magnetic tape machine or any device capable of storing data. Similarly, one computing node may be used to control some other devices, i.e. peripheral devices that have a specified function and are capable of working off internet. A good example is a remote controlled surveillance camera. Every identified client can view live videos provided by several arranged surveillance cameras over a cloud system. It can also work without being in an open environment (internet). However, when one surveillance camera needs to be changed in a monitoring system, the same requirement as the embodiment described above occurs. For these devices, additional functions can be added into a related API according the same processes mentioned above. It should be noticed that, in practice, the peripheral devices can be a printing machine, an audio equipment, a video equipment, a monitor, or a home appliance. Particularly, for the home appliance, since many home appliances have become smart and can be controlled over internet, it can be seen as an independent computing node or link to a cloud via another computing node. The present invention is still applicable.

Another key point is the computing node environment is allowed and able to update a new version of its operation system. The API should be compatible with the newest version of the operation system. If all computing node environments (operation systems) change at the same time, the docking station module 205 should consider all devices (including the 5 hard disks) are replaced and try to repack the current API for all new devices and the operation systems according to the above processes unless the API can't be usable for these devices under new computing node environment.

Figure 3:
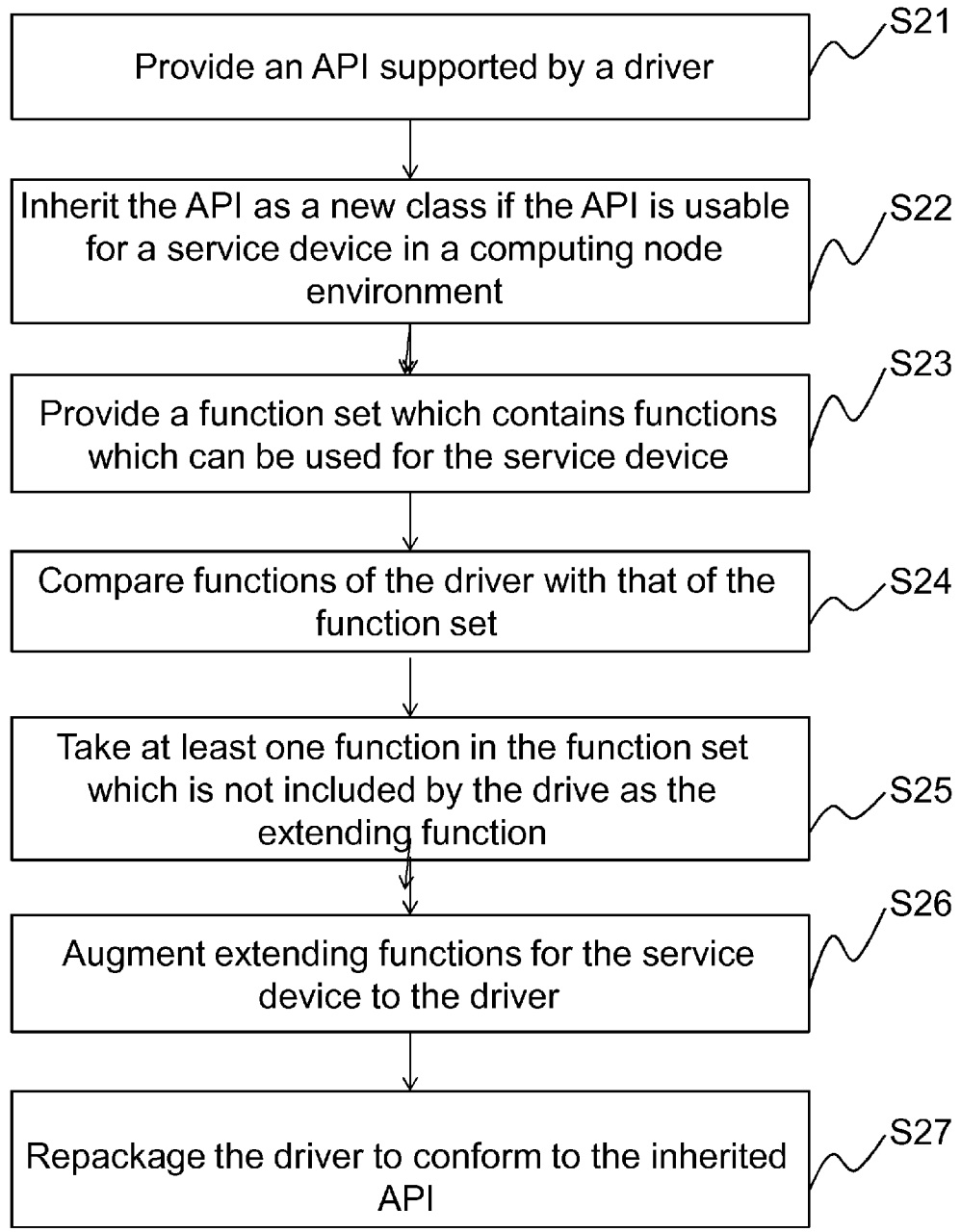
FIG. 3 is another flow chart for encapsulating functions for application programming interface in the cloud environment according to the present invention.

In another embodiment, when the docking station module 205 has a different function, ID recording, that drivers of all hard disks don't support, the present invention provides following steps for encapsulating the ID recording function into the API. Please refer to FIG. 3. First, the docking station module 205 takes the provided API supported by a driver (S21) and tests if the API is usable for the hard disks 210, 220, 230, 240 and 250 in the computing node environment. This is a step to see if current API is applicable. If the answer is yes, the docking station module 205 will inherit the current API as a new class (S22). It becomes an inherited API. Next, the docking station module 205 provides a function set which contains functions, not only including the ID recording function, to be used for the hard disks 210, 220, 230, 240 and 250 (S23) and compare functions of the drivers with that of the function set (S24). The docking station module 205 takes the ID recording function (if there are other different functions, they can be taken as well) in the function set which is not included by the driver as the extending function mentioned above (S25). Similarly, the docking station module 205 will augment the extending function(s) for the 5 hard disks to the driver (S26) in way of repackaging the driver to conform to the inherited API (S27).

In another embodiment, when the docking station module 205 finds out that drivers of the hard disks 240 and 250 have two functions that current API don't support and the docking station module 205 don't have, either, the present invention provides following steps for encapsulating the functions into the API.

Figure 4:
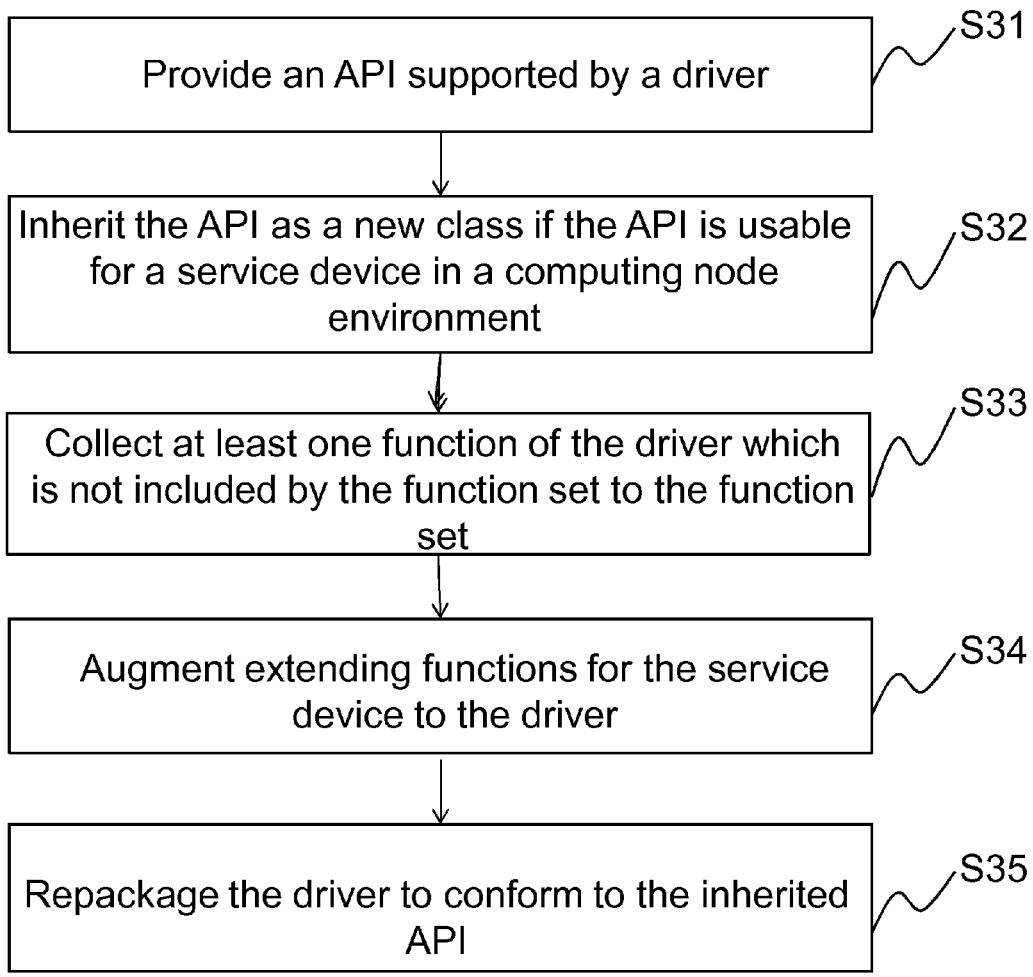
FIG. 4 is still another flow chart for encapsulating functions for application programming interface in the cloud environment according to the present invention.

Please refer to FIG. 4. First, the docking station module 205 takes the current API supported by a driver (S31) and tests if the API is usable for the hard disks 210, 220, 230, 240 and 250 in a computing node environment. If the answer is yes, the docking station module 205 will inherit the current API as a new class (S32). It becomes an inherited API. Next, the docking station module 205 collects at least one function of the driver which is not included by the function set (S33). It means that it is optional for the docking station module 205 to take any function that one hard disc (service device) may need. Similarly, the docking station module 205 will augment the extending function(s) for the 3 hard disks 210, 220 and 230 to the driver (S34) in way of repackaging the driver to conform to the inherited API (S35).

Figure 5:
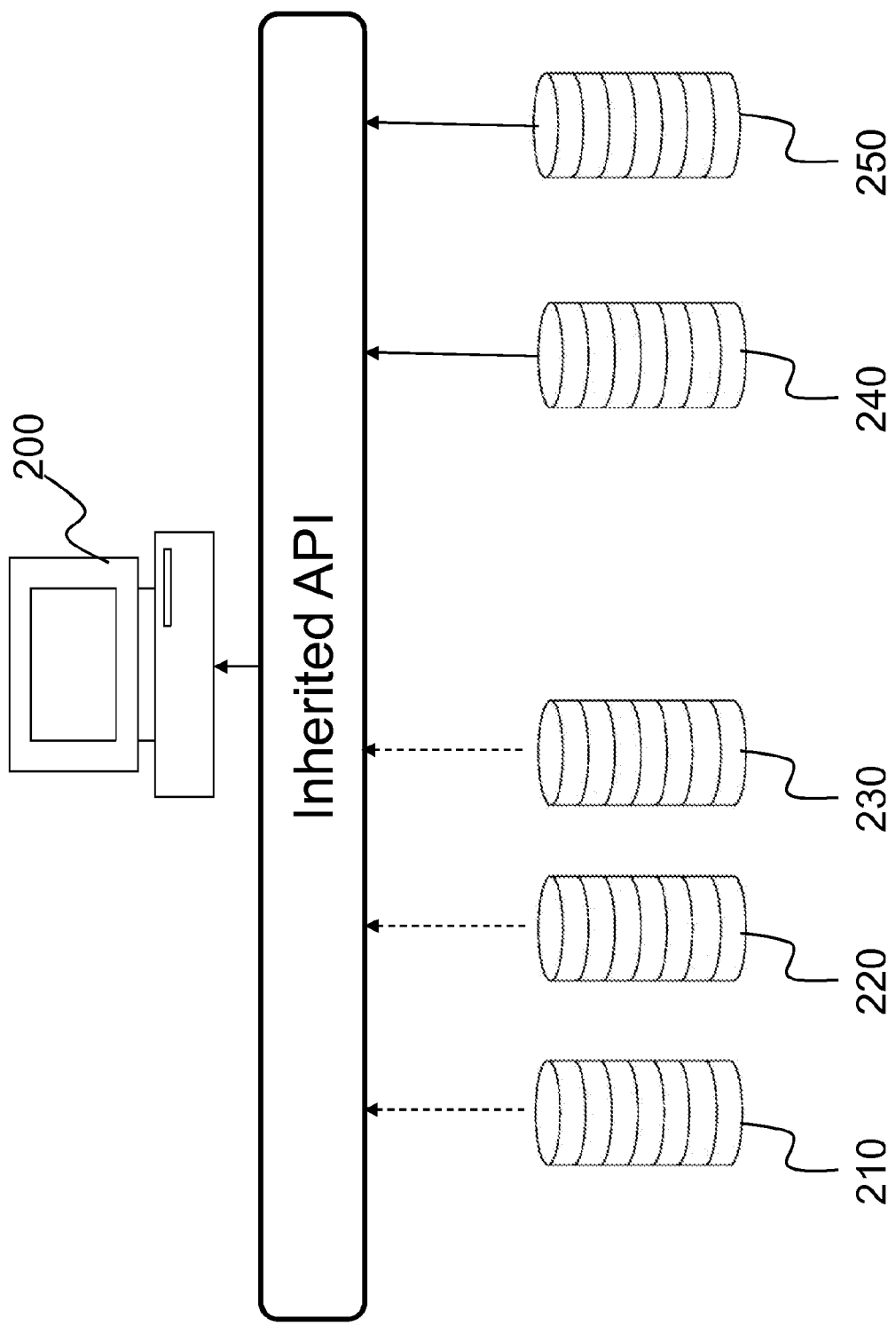
FIG. 5 illustrates access of 5 hard disks to a computing node according to the present invention.

Please see FIG. 5. For the 3 hard disks 210, 220 and 230 can extend extra functions with the help of the docking station module 205. They can access the functions that their drivers originally don't support to the computing node environment of the storage server 200 indirectly (shown by dashed lines) while the 2 disks 240 and 250 can still work well these functions via the inherited API.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for encapsulating functions for application programming interfaces (API) in a cloud environment, comprising the steps of:
   A. providing an API supported by a driver;
   B inheriting the API as a new class if the API is usable for a service device in a computing node environment;
   C. augmenting extending function(s) for the service device to the driver; and
   D. repackaging the driver to conform to the inherited API.

2. The method according to claim 1, further comprising steps between step B and step C:
   B1. providing a function set which contains functions which can be used for the service device;
   B2. comparing functions of the driver with that of the function set; and
   B3. taking at least one function in the function set which is not included by the driver as the extending function.

3. The method according to claim 2, further comprising a step between step C and step D:
   C1. collecting at least one function of the driver which is not included by the function set to the function set.

4. The method according to claim 1, wherein the API is useable when the API is able to function the service device and is compatible with the computing node environment.

5. The method according to claim 1, wherein the cloud environment is implemented by open-sourced software or proprietary software.

6. The method according to claim 1, wherein the service device is a storage device or a peripheral device.

7. The method according to claim 6, wherein the storage device is a Compact Disk Recordable and Writable (CD-RW) Drive, a Compact Disc Read-Only Memory (CD-ROM) Drive, a hard disk, a solid-state disk, a memory module, a magnetic tape machine or any device capable of storing data.

8. The method according to claim 6, wherein the peripheral device is a printing machine, an audio equipment, a video equipment, a monitor, a surveillance camera a home appliance or any device capable of working off internet.

9. The method according to claim 1, wherein the computing node environment is able to update a new version of an operation system thereof and the API is compatible with the newest version of the operation system.

10. The method according to claim 1, wherein the computing node environment contains a computing node.

11. The method according to claim 10, wherein the computing node and the computing node is a server or a Personal Computer (PC).

* * * * *